United States Patent Office 3,299,907
Patented Jan. 24, 1967

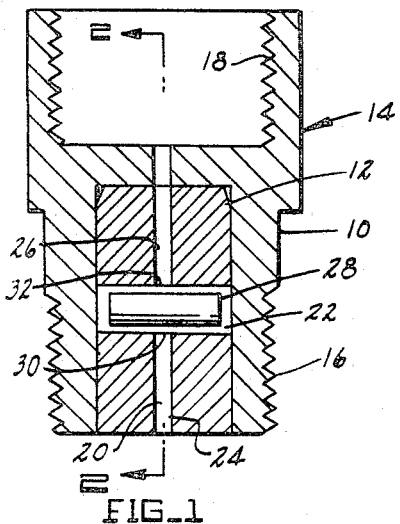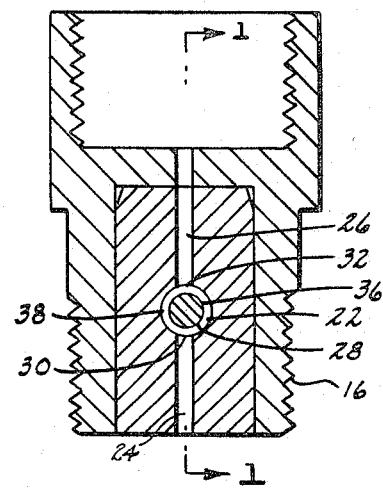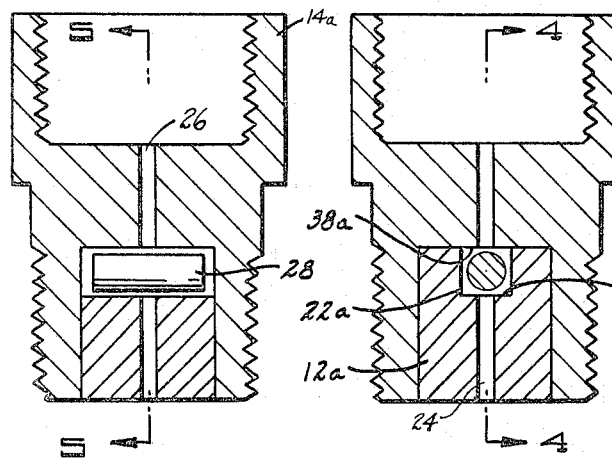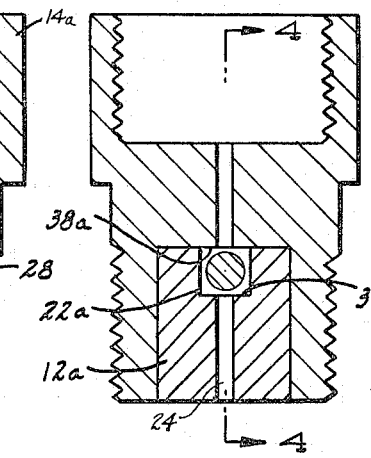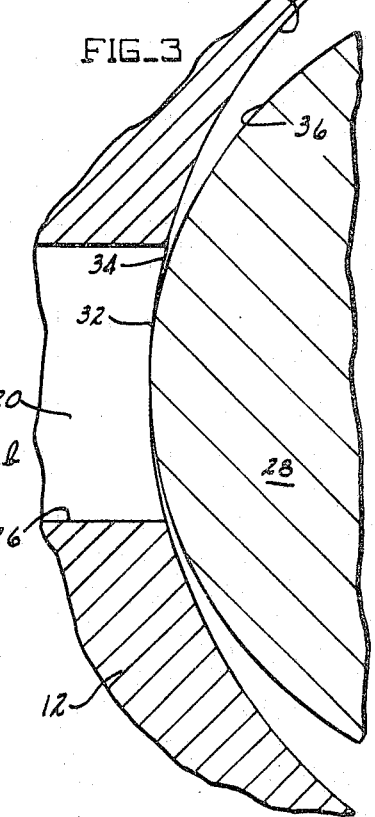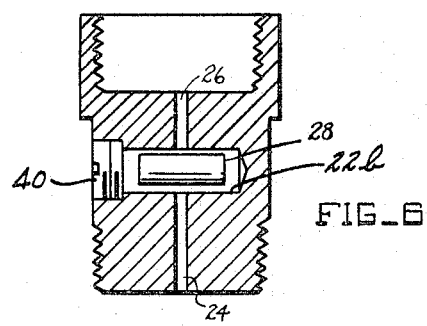

3,299,907
PULSATION DAMPENER
David Ames Wolcott, Henrietta, N.Y., assignor to American Radiator & Standard Sanitary Corporation, New York, N.Y., a corporation of Delaware
Filed Dec. 16, 1963, Ser. No. 330,931
5 Claims. (Cl. 138—26)

This invention relates to pulsation dampeners such as are used for example to protect fluid pressure gages from sudden changes in line pressure.

One object of the invention is to provide a pulsation dampener which is devoid of small crevices, slots or other small flow openings subject to plugging by foreign material in the line.

Another object is to provide a pulsation dampener having a movable restrictor element which moves through a comparatively short distance during its throttling movement, thus enabling the element to respond to high frequency pressure surges.

A further object is to provide a pulsation dampener which has a movable restrictor and fixed orifice arranged so the orifice is never completely closed by the restrictor, whereby the output from the dampener is never totally interrupted.

An additional object is to provide a pulsation dampener having parts which are subject to low cost manufacture, as by relatively simple high tolerance machine operations.

Another object is to provide a pulsation dampener wherein the dampening action can be varied to meet different pressure surge frequencies and amplitudes.

Other objects of this invention will appear from the following description and appended claims, reference being had to the accompanying drawings forming a part of this specification wherein like reference characters designate corresponding parts in the several views.

In the drawings:

FIGURE 1 is a sectional view of one embodiment of the invention taken on line 1—1 in FIG. 2;

FIG. 2 is a sectional view taken on line 2—2 in FIG. 1;

FIG. 3 is a magnified fragmentary view of part of the FIG. 2 construction;

FIG. 4 is a sectional view of another embodiment of the invention taken on line 4—4 in FIG. 5;

FIG. 5 is a sectional view taken on line 5—5 in FIG. 4; and

FIG. 6 is a sectional view of a third embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In FIG. 1 of the drawings there is shown one embodiment of the invention which includes a fitting 10 having an insert 12 press fit therein, the two parts cooperating to form a housing structure designated generally by numeral 14. Fitting 10 is provided with external threads 16 for connection with a fluid line under pressure test, and internal threads 18 for connection with a conventional pressure gage (not shown). The arrangement is generally similar to that shown in U.S. Patent 2,370,965.

As seen in FIG. 1, insert 12 is provided with a relatively small cylindrical longitudinal passage 20 and a relatively large transverse cylindrical chamber 22. Chamber 22 extends crosswise of passage 20 and divides same into a lower pressure pulse supply passage section 24 and an upper stabilized pressure output passage section 26. Floatably disposed within chamber 22 is a cylindrical flow restrictor element 28. The diameter of element 28 is somewhat less than the diameter of chamber 22 so that element 28 is capable of limited back and forth movement between the orifices 30 and 32 defined by passage sections 24 and 26. During operation of one experimental construction, it appears that pressure surges in passage section 24 effect a continuous back and forth movement of element 28, with a consequent variable throttling action on the passage fluid. The result is a substantially stabilized pressure in passage section 26, and little or no vibratory movement of the pressure gage needle and sensing mechanisms in the gage.

FIG. 3 shows to a greatly magnified scale the relation between orifice 32 and element 28 when the element is in its maximum throttling position seated on the concave cylindrical surface 38 defined by chamber 22. The radius of curvature of element surface 36 is seen to be less than that of chamber surface 38, and segmental spaces 34 are therefore formed between these surfaces. Orifice 32 is never completely closed but is always able to pass at least small amounts of fluid through the small segmental spaces 34. The gage is therefore never fully isolated from the line pressure and is responsive to gradual changes in static pressure.

When the pressure in passage section 24 increases abruptly restrictor element 28 throttles the flow into passage section 26 to prevent the pressure surge from being transmitted to the pressure gage (not shown). As the pressure wave in passage section 24 recedes from element 28 the element tends to move toward orifice 30 to maintain the pressure in passage section 26. Element 28 exerts an incrementally increasing restricting action as it approaches each orifice. In its central FIG. 1 position it exerts substantially no restricting action.

In one actual embodiment of the invention the pulsation dampener is constructed with passage 20 having a diameter of about .02 inch, with cylindrical chamber 22 having a diameter of about .08 inch, and with cylindrical restrictor 28 having a diameter of about .06 inch. With such dimensions the cylindrical restrictor has a travel of about .02 inch as it moves between orifices 30 and 32. This pulsation dampener was installed between a conventional pressure gage and a source of pulsing liquid having a static pressure of about 300 p.s.i. and a pulsation frequency in the neighborhood of 2,500 pulsations per minute. Dampening of the gage needle was achieved in tests run with pulses of different amplitude, varying from peaks of 500 p.s.i. up to 2,000 p.s.i. During operation, the device appears to function as a low pass filter in which the peak portions of the pressure wave are clipped off to provide a substantially constant pressure at the gage.

The dampening action appears to be affected somewhat by three dimensions, namely passage 20 diameter, chamber 22 diameter, and element 28 diameter. Increasing the diameter of passage 20 increases the size of each segmental flow space 34 and thus lessens the throttling effect. Similarly, decreasing the diameter of element 28 increases the size of each segmental flow space 34 and thus lessens the throttling effect. By properly choosing dimensions it is possible to tailor the dampening action to various different conditions of pulsation amplitude, pulsation frequency, and fluid viscosity. The mass of element 28 should be chosen so that the device operates in the intended manner; i.e., the element should be light enough so that during each pulse the element restricts the passage well before the peak pressure is reached.

One important advantage of the illustrated dampener construction is its self-cleaning characteristic. When the dampener is used for example on a tractor lubricating system (where conditions of dust, dirt and sludge are prevalent) the fluid is apt to have considerable dirt and foreign matter entrained therein so that conventional pulsation dampeners having small crevices, slots or other small flow openings are subject to plugging after a short service life. In the arrangement shown in FIGS. 1 and 2 the cylindrical surfaces 38 and 36 are each smooth and without interruptions, slots or the like. Additionally the parts are dimensioned so that considerable clearance is provided between surfaces 38 and 36 when element 28 is in the FIG. 2 free flow position. As a result, the dampener is believed to be self-cleaning and therefore free from becoming plugged with dirt, even after extended operational periods.

It is realized that the invention can be practiced in other structural forms than that shown in FIGS. 1 and 2. For example, it is not believed essential for chamber 22 to be cylindrical in all cases. As shown in FIGS. 4 and 5, chamber 22a is of rectangular cross section and is formed by a milling operation in the upper end surface of insert 12a. The throttling action of cylindrical element 28 is essentially the same as that of the previous embodiment. However, the fixed seating surfaces 38a and 38b are flat, and for a given diameter element 28 there is therefore less throttling than with the FIG. 1 element. This is due to the fact that the cylindrical surface of element 28 presents a relatively large angle to surface 38a or 38b so that segmental spaces 34 are relatively large.

In some cases it may be desirable to have access to the cylindrical restricting element without disassembling insert 12 or 12a from fitting 14 or 14a. FIG. 6 shows an arrangement wherein cylindrical chamber 22b is formed in the fitting and is closed by a plug 40. By removing the plug it is possible to quickly gain access to chamber 22b and throttling element 28 for repair or replacement purposes. If desired the dampener can be built into a pressure gage as shown in U.S. Patent 2,220,902.

The primary features of this invention are the crosswise disposition of restrictor element 28 and its confining chamber 22 whereby the element enjoys a comparatively short distance movement to obtain its throttling effect without at any time completely interrupting pressure transmission from the pressure source to the pressure gage. Also of considerable importance is the smooth surfaced nature of the chamber and element which prevents plugging. Of further interest is the fact that for most operational situations the parts can enjoy relatively large manufacturing tolerances without impairing operability. In special situations the dampener has the ability to be tailored to unusual surge conditions and fluid viscosities, as by varying one or more of the surface dimensions.

What is claimed:

1. A pulsation dampener comprising a passageway having two relatively small passage sections and an enlarged pressure chamber therebetween; said chamber forming two spaced seating surfaces at its junctures with the passage sections; and a flow-restricting element floatably disposed in the chamber for movements back and forth between the passage sections; said chamber and restricting element being dimensioned so that the element has substantially no restricting action when in an intermediate position, but has a progressively increasing restricting action as it moves incrementally from the intermediate position toward either passage section; the distance between seating surfaces being only slightly greater than the corresponding dimension of the flow-restricting element whereby the element moves only a minor fraction of its dimension; the seating surface contour in each case being flatter than the surface contour of the flow-restricting element whereby the element is incapable of fully closing either passage section.

2. A pulsation dampener comprising means forming a cylindrical concave seating surface; a flow orifice in said surface; and a convex cylindrically surfaced flow-restricting element movable toward said seating surface to throttle flow through the orifice; the axis of the flow restricting elements being parallel to the axis of revolution of the concave seating surface; the radius of curvature of the seating surface being greater than that of the flow restricting element surface so that segmental flow openings are provided at the orifice when the element is in a seated position.

3. A pulsation dampener comprising a housing structure having a relatively small passage extending longitudinally therethrough, and an enlarged chamber extending crosswise of the passage to intersect and separate same into two passage sections; and a cylindrical flow restrctor floatably disposed within the chamber for movement back and forth between the passage sections; said cylindrical restrictor being located so that its axis extends transversely across the longitudinal axis defined by the small passage.

4. A pulsation dampener comprising a housing adapted to be connected between a source of pressure and a pressure gage; said housing having a relatively small diameter flow passage extending longitudinally therethrough, and a relatively large diameter cylindrical chamber extending crosswise of the flow passage to separate same into two passage sections; and a cylindrical flow restrictor floatably disposed within the cylindrical chamber in general parallelism therewith for movement back and forth between the passage sections.

5. The dampener of claim 4 wherein the flow passage has a diameter of about .02 inch, the cylindrical chamber has a diameter of about .08 inch, and the flow restrictor has a diameter of about .06 inch.

References Cited by the Examiner

UNITED STATES PATENTS

| | | | |
|---|---|---|---|
| 360,326 | 3/1887 | Richert | 138—26 |
| 942,666 | 12/1909 | Romstaedt | 138—26 |
| 2,346,667 | 4/1944 | Dowty. | |
| 2,370,965 | 3/1945 | Kahn | 138—46 |

LAVERNE D. GEIGER, *Primary Examiner.*

T. L. MOORHEAD, *Assistant Examiner.*